United States Patent [19]
Joseph

[11] 4,112,405
[45] Sep. 5, 1978

[54] COIL WITH PROTECTION AGAINST OVERHEATING

[76] Inventor: Mark Joseph, 2400 N. Lake View, Chicago, Ill. 60614

[21] Appl. No.: 714,342

[22] Filed: Aug. 16, 1976

[51] Int. Cl.² .............................................. H02K 11/00
[52] U.S. Cl. ..................... 337/4; 310/68 C; 335/142; 361/25
[58] Field of Search .............. 310/68 C; 336/61, 192; 337/4, 401, 414; 361/25, 37, 41, 104; 335/142

[56] References Cited
U.S. PATENT DOCUMENTS

| | | | |
|---|---|---|---|
| 3,219,856 | 11/1965 | Dunwiddie et al. | 361/25 X |
| 3,405,317 | 10/1968 | Anderson | 361/104 X |
| 3,585,450 | 6/1971 | Lane | 361/41 |
| 3,691,425 | 9/1972 | Weyrich et al. | 361/41 |
| 3,875,439 | 4/1975 | Roach | 310/68 C |
| 3,959,675 | 5/1976 | Lautner et al. | 336/192 X |

FOREIGN PATENT DOCUMENTS 973,263  8/1975  Canada ............................ 361/47

Primary Examiner—A. D. Pellinen
Attorney, Agent, or Firm—Charles A. Laff; J. Warren Whitesel; Howard B. Rockman

[57] ABSTRACT

A plastic coil bobbin has a recess with the precise dimensions of a thermal fuse. On one side, the recess is open so that, as the coil is wound on the bobbin, successive layers of coil wire form a wall-like surface closing that open side. As the fuse is press fit into the recess, it is also forced into intimate contact against the wall of wire. Thus, the only material between the fuse and wire is a thin plastic shell forming the fuse housing. Since the fuse rating takes this wall thickness into account, there is effectively no thermal insulation between the coils and the fuse. Accordingly, under overheating conditions, the fuse opens a circuit when there is overheating and before a fire can start.

7 Claims, 6 Drawing Figures

COIL WITH PROTECTION AGAINST OVERHEATING

This invention relates to electrical coils or windings, and more particularly to coils or windings having a hot coil protection fuse.

Electrical coils and windings (hereinafter generally and collectively called "coils") are used in many different applications and locations, an important one of which is as a winding for use with an electric motor. If the coil initially functions properly, there should not be any coil problems throughout the life of the motor since coils do not normally wear. On the other hand, if the associated equipment does not function properly (e.g., the motor could stall), all of the energy going into the coil must be dissipated by it. It begins to heat and may ultimately burn out. As the coil so heats, there may come a time when it generates enough heat to set fire to surrounding combustible material. Therefore, standard safety regulations often require a coil to be protected in such a manner that electric power is removed from the coil before it can heat sufficiently to reach a critical kindling temperature.

There are a number of different forms of fuses, circuit breakers, and the like (hereinafter generically called "fuses"), which open a circuit when there is a sufficiently high, locally generated temperature. One of these devices is a pellet which is encapsulated in insulating material and may be connected in series with the coil. The pellet melts at a predetermined temperature. Thereafter, the circuit is opened permanently, and the coil is thrown away. (All references herein to the fuse "melting" also encompass circuit breakers opening, transistors switching on, wires being cut, or the like).

The problem is how best to insure that the heat generated by the coil reaches the fuse quickly enough. In the past, the fuses have been physically mounted on the coil in such a manner that there was a considerable delay between the time when the coil reached a critical temperature and the fuse melted. For example, fuses have been taped onto the coil or its bobbin, either before or after winding. If the fuse is taped onto the bobbin, these are loose connecting wire ends which may become entangled and, perhaps, cause severe damage during winding. If the fuse is taped onto the completed coil, it is difficult to keep the turns from loosing, to attach the fuse and coil wires, and the like.

Because of these and similar problems, bobbins have sometimes been made with pockets formed in them. A fuse is placed in the pockets and then connected to the coil winding. However, this approach has also caused problems since the bobbin wall adjacent the pocket forms a large amount of thermal insulating material, which is between the fuse and the coil. While the coil and fuse eventually reach the same temperature, this insulating material causes a thermal delay so that the fuse does not reach the critical temperature soon enough for safety and fire prevention. By the time the fuse melts, the hot coil may have already started a fire. This means that the melting temperature of the fuse must be much lower than it would be, if enough time could be allowed for the fuse to heat to the allowable operating temperature of the coil. That, in turn, introduces further problems since normal manufacturing tolerances cause an unpredictable response and the specified fuse temperature must be even lower. Herefore, to be safe, the fuse had to melt at a specified temperature which was much lower than it really has to be. Since a melted fuse completely destroys the coil, it must be discarded and replaced by a new coil, and perhaps a whole new motor. This means that there is a relatively high and needless expense if a coil fuse must always burn out at a temperature which is much lower than is really necessary. For example, suppose that a coil fuse opens at 150° C. in order to prevent a fire. To be safe, it might be necessary to specify that a fuse in an insulated bobbin pocket will burn out at 95° C. This means that after a thermal delay, the fuse burns out even if the temperature of the coil never exceeds 95° C, and the coil is perfectly safe up to 150° C. Thus, many coils are destroyed needlessly.

If any portion of the thermal delay could be reduced or eliminated, the fuse could be designed to melt at a higher temperature. That would mean that fewer coils would have to be replaced.

Accordingly, an object of the invention is to provide new and improved high temperature protection for coils. Here, an object is to provide means for reducing thermal delay for fuse protection of coils, in particular, an object is to enable the melting point of fuses to more closely approach the allowable limits for coil temperatures.

Another object of the invention is to enable coils to be manufactured by established and reliable fabrication techniques and thereafter to add the fuse to the coils. In this connection, an object is to enable the fuse to be so added with intimate contact between the coil and fuse.

In keeping with an aspect of the invention, an insulating coil bobbin is made with a recess having the precise dimensions of a fuse. The wall on one side of the recess is closed to the individual turns in the coil. Therefore, a fuse placed in the recess is in intimate contact with the successive layers of coil wire. As the fuse is press fit into the recess after the coil has been wound on the bobbin, it is also forced against the wire so that the only material between the fuse and the wire is a thin plastic wall of the fuse housing. Since the manufacturer's fuse rating takes into account the thermal insulation of the housing wall thickness, there is effectively no new insulation between the coil and the fuse. Consequently, the fuse specification may be raised to become more nearly the safe limit of the coil, itself.

The invention will be better understood from a study of the attached drawing in which.

Figure 4:
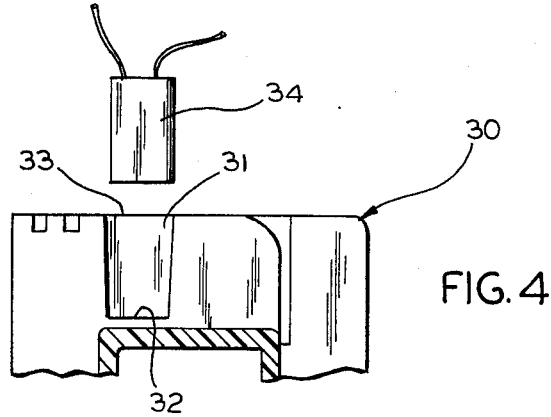
Figure 5:
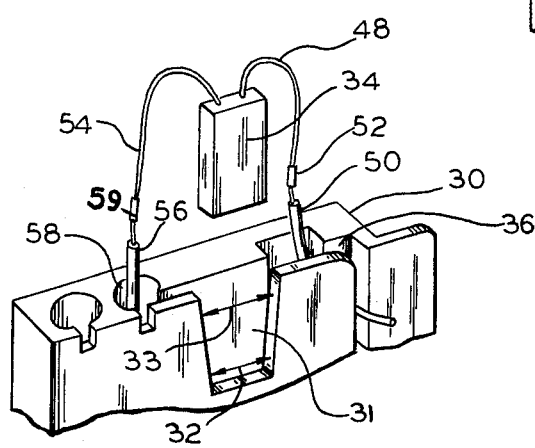
Figure 6:
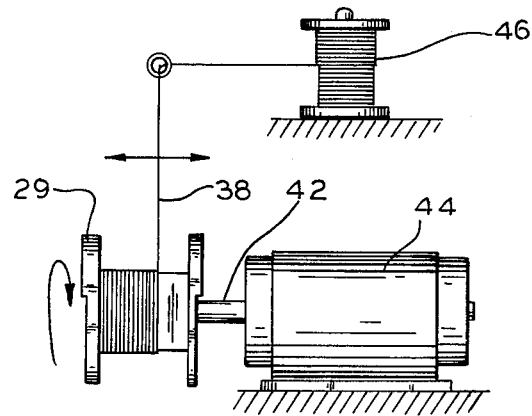

FIG. 4 schematically shows how the recess is shaped and proportioned in order to capture the fuse by a press fit;

FIG. 5 schematically shows a first step in the inventive process whereby the coil is wound on the bobbin; and FIG. 6 shows a second step in the inventive process wherein the fuse is attached to the coil wound during the manufacturing step of FIG. 5 and thereafter press fit into the bobbin recess.

Figure 1:
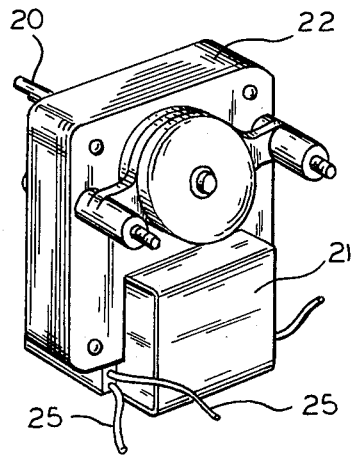
FIG. 1 is a perspective view of an electrical motor, which is an exemplary usage of the inventive fuse protected coil.
Figure 2:
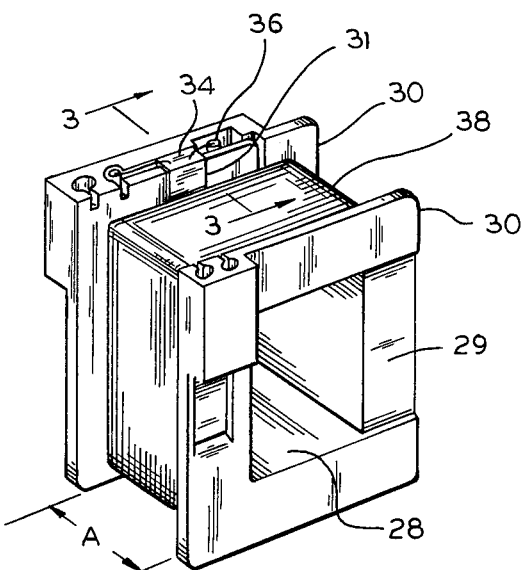
FIg. 2 is a perspective view of a bobbin with a coil wound thereon and a fuse therein.

Briefly, FIG. 1 shows a motor as an exemplary one of many possible coil uses. The motor includes a rotor 20, a coil or winding 21, and a laminated magnetic structure 22. This particular motor may have any suitable use such as to drive a fan for cooling heated enclosures. However, motors, per se, and fan motors in particular, are only an exemplary one of many possible uses.

The fan motor may stop rotating for any of many different reasons, such as worn or contaminated bearings, a mechanically caught fan blade, or the like. If it does so stop, the energy which normally is dissipated in turning the fan must be dissipated as heat. As the motor heats, it may become hot enough to start a fire. Therefore, it is necessary to place a fuse in series with one of the wires 25 leading to the coil 21. As the motor heats, the fuse melts to open the circuit including the wires 25.

According to the invention, a molded plastic bobbin 29 is formed with a hub 28 terminated on each end by a flange 30, 30 to define a winding area A, therebetween. A recess 31 is formed in one of the flanges 30. The recess 31 (FIG. 4) is tapered to be slightly more narrow in the bottom 32 than at the top 33. The fuse housing 34 has essentially the same outside dimensions as the inside dimensions of the recess, except that the housing does not taper. Therefore, when the fuse is pressed into the recess 31, it is snugly and firmly held in place. Extending perpendicularly from the hub 28 and away from the recess 31 is a groove 36 formed in flange 30. This groove communicates from the recess 31 into the winding side of a bobbin to enable the fuse to be connected to the coil.

Figure 3:
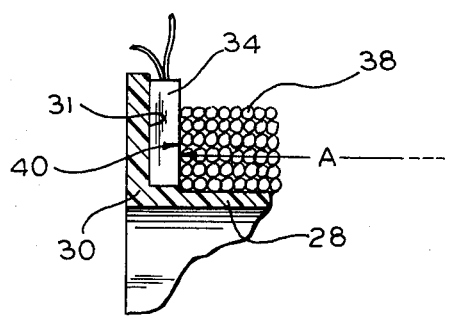
FIG. 3 is a partial cross-sectional fragment of FIG. 2, taken along line 3—3, thereof.

Wire 38 is wound upon the bobbin 29, and successive winding layers come to rest upon the inside surfaces of the bobbin hub and against the flanges 30. As the layers of wire 38 rise from the bobbin hub, a wall 40 of wire (FIG. 3) rises adjacent the open side of recess 31. Therefore, when the fuse 34 is pressed into recess 31, after the wire 38 is in place upon the bobbin 29, one side wall 40 of the fuse is in intimate contact with the wire 38. This means that there will be a direct and rapid transfer of heat from the wire directly to the fuse. The lead from the fuse 34 may be attached to the wire 38 and thereafter laid in the groove 36 communicating with the inner side of the flange 30.

FIGS. 5 and 6 disclose the inventive method of manufacturing a coil. First, the bobbin 29 is placed upon a spindle 42 driven by a motor 44. Next, wire 38 is drawn from a spool 46 of wire and wound upon the bobbin 29. There are no loose ends whirling about while the bobbin 29 turns on spindle 42. There are no accessories to tape upon the bobbin 29, either before or after the winding process.

After the bobbin is completely wound, one lead 48 on fuse 34 is attached to the end 50 of the coil winding by any suitable means such as a compression connector 52, for example. Then, the wires 48, 50 and connector 52 are pressed downwardly into the groove 36.

The other lead 54 of the fuse 34 is attached to an insulated wire 56 by means of a compression connector 59. The wire 56 is fed through a hole 58 molded into the plastic bobbin. Thus, hole 58 enables the external wire 56 to enter the side of the flange 30, which is opposite the winding area A, and to make electrical contact with the fuse 34. This wire 56 may be the same as the wire 25 (FIG. 1) which is used to energize the motor.

Those who are skilled in the art will readily perceive how various modification and improvements may be made in the invention. Therefore, the attached claims are to be construed to cover all equivalents falling within the true scope and spirit of the invention.

I claim:

1. A heat protected coil comprising an integral bobbin including a hub terminated on each end by a flange, at least one of the flanges having a recess formed therein with an open side facing a winding area in said bobbin, whereby wire wound upon the bobbin forms a wall of wire closing the open side of said recess, a thermal fuse in an electrically insulated housing pressed into said recess, said insulated housing shaped and configured to fit into said recess with intimate physical contact with the layers of a coil forming said wall of wire wound into said winding area, and means for electrically connecting said fuse in series with said coil.

2. The coil of claim 1 and a groove communicating between said recess and said winding area for enabling said series connection to be recessed within said bobbin.

3. The coil of claim 1 and a groove formed in said one flange substantially perpendicular to said hub and extending from said recess through said flange wall and into said winding area in order to provide a passage for a conductor connecting said fuse to said winding.

4. The coil of claim 3 and a passageway in said bobbin for connecting said fuse to an external wire entering the side of said flange which is opposite to said winding area.

5. A method of making a thermally-protected coil wound upon a bobbin, said method comrising the steps of:
 (a) first forming a bobbin having an open-sided recess in one side thereof, said open side facing a winding area on said bobbin,
 (b) thereafter winding a coil into said winding area,
 (c) next pressfitting an electrically insulated fuse into said recess and in direct physical contact through the open side of said recess with the windings of said coil, and
 (d) then connecting said fuse between the windings of said coil and a wire for supplying electrical power to said coil to thereby complete a series circuit which is opened to eliminate electrical power when said fuse actuates.

6. The method of claim 5 and the added step of fitting said fuse and the connection between said fuse and the windings of said coil into a groove in said bobbin which communicates between said recess and said winding area.

7. The method of claim 6 and the added step of fitting said other wire for supplying electrical power through another opening in said bobbin and connecting it to said fuse.

* * * * *